(12) United States Patent
Beck et al.

(10) Patent No.: US 6,235,229 B1
(45) Date of Patent: May 22, 2001

(54) COINJECTION MOLDING OR MULTI-LAYERED ARTICLES

(76) Inventors: Martin H. Beck, 23 Standish Way; George F. Rollend, 38 Green Rd., both of Amherst, NH (US) 03031

(*) Notice: Subject to any disclaimer, the term of this patent is extended or adjusted under 35 U.S.C. 154(b) by 0 days.

(21) Appl. No.: 09/305,617

(22) Filed: May 5, 1999

Related U.S. Application Data

(62) Division of application No. 08/838,658, filed on Apr. 9, 1997, now Pat. No. 5,971,735.

(51) Int. Cl.[7] .................................................... B29C 45/16
(52) U.S. Cl. ................. 264/255; 264/297.2; 264/328.8; 264/328.14; 264/328.16; 264/328.19
(58) Field of Search ..................................... 264/255, 513, 264/516, 297.2, 328.7, 328.8, 328.14, 328.16, 328.19; 425/130, 562, 570, 572, 588

(56) References Cited

U.S. PATENT DOCUMENTS 5,221,507 * 6/1993 Beck et al. ............................ 264/255
5,374,178 * 12/1994 Nakayama ............................ 425/130
6,129,536 * 10/2000 Beck et al. .

* cited by examiner

Primary Examiner—Mathieu D. Vargot
(74) Attorney, Agent, or Firm—Davis & Bujold, P.L.L.C.

(57) ABSTRACT

A multi-cavity coinjection mold having a relatively large plurality of cavities for simultaneously molding a relatively large plurality of multi-layered articles including a) a plurality of cavity groups each defining a relatively small plurality of said cavities, a single balanced hot runner for supplying said relatively small plurality of cavities with contiguous different plastics materials, and a valve for sequentially supplying desired contiguous quantities of the plastics materials from plastics material sources, common to all of said groups, to the balanced hot runner; and b) a hot runner manifold system connected to the plastic material sources to supply the plastic materials to all of the valves; and related methods.

8 Claims, 4 Drawing Sheets

COINJECTION MOLDING OR MULTI-LAYERED ARTICLES

This is a divisional application of U.S. patent application Ser. No. 08/838,658 filed Apr. 9, 1997, now U.S. Pat. No. 5,971,735.

FIELD OF THE INVENTION

This invention relates generally to coinjection molding and particularly relates to an improved apparatus and method for simultaneously molding a plurality of multi-layered articles.

DEFINITIONS

As Used Herein:

"First and second materials" is intended to cover at least two materials which are sequentially supplied to an injection mold, it being entirely possible that one or more other materials may be sequentially supplied before, between, or after the first and second materials;

"Balanced Hot Runner" is a temperature controlled heated uninterrupted material conveying system extending from a single input (e.g. a material source or metering valve) to a plurality of outputs (e.g. metering valves or injection mold cavities) comprising a single passage branched into a plurality of passages with each of said plurality of passages, communicating with one of the plurality of outputs, for conveying material therethrough to simultaneously supply equal quantities of the material to each of the outputs;

"Unbalanced Hot Runner" is a temperature controlled heated material conveying system, for the passage of material from an input (e.g. material supply source) to a plurality of outputs (e.g. metering valves for metering the material for supply of metered quantities of the material to injection mold cavities), which is not branched to provide passages of identical cross-section and length and does not divide the supplied material into equal quantities for the simultaneous supply of these quantities each to one of outputs.

The manufacture of pure, or virgin, resin preforms for blow molding containers is well known within the prior art. But since the advent of recycling, it is now possible to manufacture preforms with materials that are compositionally less pure than virgin materials. Such degraded, or recycled, materials not only yield positive environmental benefits in an ecologically fragile era but provide manufacturers with an alternative manufacturing method which allows for substantial reductions in costs.

But, since recycled materials are obtained from post consumer solid waste, certain new manufacturing problems have been encountered that were heretofore previously unknown. For example, manufacturers must now provide, at increased costs, additional equipment for keeping the virgin and recycled materials separate from each other. In addition, multi-layered articles, such as preforms, that are eventually used to form containers for food stuffs, have even further impediments by way of rigid statutory guidelines. The guidelines, enacted by the Food and Drug Administration (FDA), require that certain minimums must be met, or exceeded, before the containers can be approved as "qualified" to contain food stuffs and before the foods are allowed to be distributed to the consumer population. One extremely noteworthy FDA provision enacted theretowards provides for the assurance of product "cleanliness".

Currently, in order to meet the FDA cleanliness standards, a container must be configured such that only surfaces of virgin materials contact the foods and beverages therein. Other container surfaces, such as areas for contacting the human mouth, e.g. the dispensing orifice on a soda container, also require virgin material surfaces. As a result, it is economically desirable to provide manufacturers with a apparatus capable of utilizing recycled materials within containers while, at the same time, preventing recycled materials from contacting the very foods and liquids that are to be distributed to, and consumed by, the public.

Some advances towards the aforementioned goal have been attained by using coinjection molding techniques to manufacture multi-layered containers. The multi-layered containers thence produced have interior and exterior surfaces of the container comprised of virgin materials while the fill and support materials located within the interior of the container walls comprise the degraded, less than pure, recycled materials. Consequently, the economies and conservation of utilizing recycled materials is thereby achieved while simultaneously meeting the strict FDA statutory requirements.

Prior art coinjection molding techniques that produce the multi-layered containers described above, often first manufacture a multi-layered preform and then blow mold the preform into the final container. The formation of multi-layered containers are described in detail, for example, in Applicant's U.S. Pat. Nos. 4,550,043 and 5,221,507.

Typically, the preforms are injection molded in multi-cavity molds which may have as many as 96 cavities. These preforms are then simultaneously produced by injecting appropriate amounts of a first and second material, i.e. virgin and recycled, into each of the cavities. To this end, the mold defines a manifold arrangement to convey the two materials to each of the singular cavities. Such an arrangement, as in Applicant's prior patents, is known to convey each of the first and second materials contiguously through a singular hot runner to the cavities. This allows for a reduction in equipment costs due to the singular hot runner arrangement. The singular hot runner is repeatedly divided the materials flowing therein into a plurality of flow paths for delivery to each cavity and to thereby ultimately provide each cavity with a substantially equal amount of metered material at substantially the same temperature and at substantially the same time as every other cavity. Yet, with mold arrangements containing large numbers of cavities, such as with forty-eight and ninety-six cavities, the two materials contiguously flowing within a singular conduit have been known to have interface boundary problems between the virgin and recycled materials when conveyed contiguously over lengthy distances.

Other prior art multi-cavity mold apparatus, that use coinjection molding to form multi-layered preforms, utilize molds in which a completely separate manifold system for each material, i.e. virgin and recycled, is used to separately convey that specific material to the singular cavities. The separate materials are then, either, injected simultaneously into the cavities using concentric nozzles or injected sequentially into the cavities utilizing a valve arrangement closely adjacent each cavity to control the flow from the separate manifolds. Such arrangements result in molds that are expensive and complex. In addition, such molds result in difficulties in controlling the temperature of the material to be injected into the cavity in a manner such that each mold receives an accurately metered quantity of material at substantially the same temperature.

OBJECTS AND SUMMARY OF THE INVENTION

Accordingly, it is an object of the present invention to provide an apparatus and method that yields a delivery method for a first and second material that delivers the respective materials at substantially the same temperature and at reduced costs due while conveying substantially equivalent amounts of the respective materials at substantially simultaneous delivery times.

It is a further object of the present invention to provide a more distinct division between the recycled and pure materials being contiguously conveyed within the same conduit to the individual mold-cavities in order to more accurately provide a substantially equivalent amount of molding materials to each cavity.

It is a further object of the present invention to provide a method and apparatus using a multi-cavity coinjection mold which avoids the complex construction and expense of prior art multi-cavity coinjection molds and which provides a low cost, relatively simple, easy to regulate mold which is suitable for use on existing machinery at minimal conversion costs.

According to the invention, these and other objects are achieved by providing an apparatus and method that utilizes a hot runner manifold system which keeps at least one of a plurality of molding materials, virgin and recycled, for example, physically separated from the other(s) until they have been conveyed to a plurality of cavity groups each comprising a plurality of individual mold cavities. Once conveyed to the groups, the molding materials are combined by a timed valve distribution mechanism, one valve mechanism per group, to produce a supply of material comprised of metered contiguous quantities of the different materials. The contiguous quantities of material are then conveyed, within each group, in a balanced hot runner system wherein the material is evenly divided for injection simultaneously and sequentially into the individual cavities in desired amounts of the materials to produce a plurality of similar multi-cavity preforms.

According to the invention there is provided a multi-cavity coinjection mold having a relatively large plurality of cavities for simultaneously molding a corresponding relatively large plurality of multi-layered articles comprising: a) a plurality of cavity groups each defining (i) a relatively small plurality of said cavities, (ii) a single balanced hot runner for sequentially supplying said relatively small plurality of cavities with contiguous different plastics materials, each plastics material being supplied simultaneously in substantially equal quantities to each of said relatively small plurality of cavities, (iii) temperature control means for maintaining said balanced hot runner and said cavities at desired temperatures; and (iv) valve means for sequentially supplying desired contiguous quantities of said plastics materials from of said plastics materials, common to all of said groups, to said balanced hot runner for contiguous sequential passage of said plastic materials to each said small plurality of cavities; and b) hot runner means connected to the plastics material sources respectively to supply the plastics materials to all said valve means.

Also according to the invention there is provided a coinjection method for multi-layer coinjection mold having a relatively large plurality of cavities for simultaneously molding a corresponding relatively large plurality of multi-layered articles comprising the steps of: a) dividing the relatively large plurality of cavities into a plurality of cavity groups each defining a relatively small plurality of said cavities; b) providing a single balanced hot runner for each group; c) temperature controlling said balanced hot runners and said cavities at desired temperatures; d) providing a valve means for each group, for controlling the sequentially supply of desired contiguous quantities of said plastics materials from sources of said plastics materials, common to all of said groups, to the balanced hot runner of its associated group for contiguous sequential passage of said plastics materials to each said small plurality of cavities of that group; and e) sequentially supplying each said cavity with contiguous different plastics materials simultaneously in substantially equal quantities by way of said balanced hot runners.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
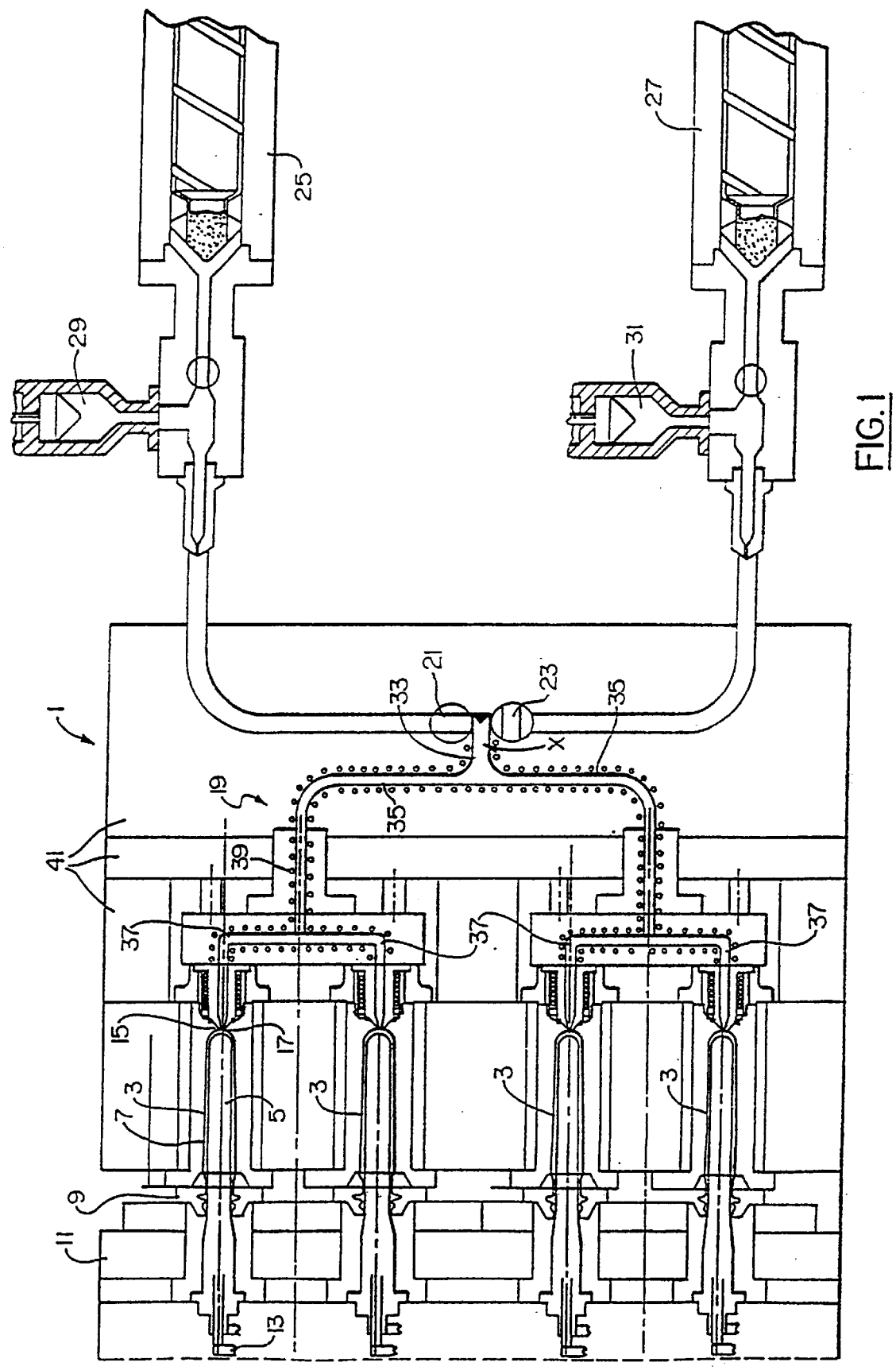
FIG. 1 is a diagrammatic cross-section of a portion of a multi-sequential coinjection mold system according to the present invention.

With reference to FIG. 1, a cavity group 1 of a larger multi-cavity mold for the sequential coinjection molding of multi-layered preforms for the blow molding of multi-layered containers comprising interior and exterior surfaces of a virgin material (e.g. polyethylene terephthalate, PET) is illustrated as having four cavities 3 therein. It will be appreciated by those skilled in the art that, in practice, the cavity group 1 depicted is part of a multi-cavity coinjection mold that may have forty-eight, sixty-four, ninety-six or even more cavities. Four cavities are used in this example to simplify explanation of the present invention which is applicable to molds with cavity groups 1 having two or more cavities, particularly where the number of cavities is a multiple of two.

Each cavity is defined by a core rod 5 and a female cavity portion 7, formed in the mold itself, together with a neck defining split neck ring 9 through which the core pin 5 extends to a core pin/split neck ring support block 11 through which core pin cooling water may be supplied by way of cooling eater tubes 13. At the base 15 of each cavity is a gate 17 through which passes the material which will form the preform in that cavity.

The cavity groups 1 together form the multi-cavity mold. The cavity groups 1 are substantially identical and only one will be described in detail. The exemplary cavity group defines a balanced hot runner illustrated generally by reference number 19 which extends from diverter valves 21 and 23 which regulate the supply of virgin and recycled molten PET from plasticizer barrels 25 and 27, respectively, under the control of material metering ram pots 29 and 31. The diverter valves 21 and 23 regulate the supply of molten PET to a single balanced hot runner 33 forming part of the manifold system 19. The balanced hot runner 33 is divided into two hot runners 35 of identical cross-section and length and these hot runners 35 are again divided each into further hot runners 37, again of identical cross-section and length, which lead one to each cavity 3 by way of its associated gate 17, thereby to ensure that the molten PET is metered in substantially equal amounts simultaneously to each cavity. Heating means 39 is provided to maintain and control the temperature of the molten PET as it is distributed through the hot runners of the manifold system. To facilitate accurate temperature control the manifold system is insulated by insulating means 41.

Construction details of the mold 1, its manifold system, the heating means and the insulating means together with the cavity design and cooling arrangements for the core pins and cavities, the split neck rings etc. are considered to be conventional in this technology and will be readily apparent to those skilled in the art. Similarly the plasticizer barrels and ram pots are of conventional construction as are the general engineering details of the diverter valves. Accordingly these matters will not be described in detail in this application.

The timed valve distribution mechanism 21, 23 provides contiguous materials within singular conduit 33 as a continuous supply. Such contiguous length of material is supplied to singular conduit 36 from diverter valves 21, 23 which regulate the supply of the first and second materials from a temperature controlled hot runner manifold system 50.

In operation, hot runner system 50 receives first and second materials from plasticizer barrels 25 and 27 under control of metering ram pots 29 and 31, respectively. Such hot runner system 50 then separately conveys the first and second materials to each of the appropriate cavity groups 1 (indicated in FIG. 1 by the jagged break of hot runner manifold system 50) for the purpose ultimately of injecting each of the four individual cavities 3 within each region with appropriate amounts of material. Hot runner system 50 conveys first and second materials, through respective unbalanced hot runners 52 and 54, to one valve distribution mechanism 21, 23 per cavity group 1.

It should be appreciated that separate conveyance of the first and second materials to regions proximate the cavities will prevent any interface boundary difficulties between the first and second materials since the two materials are not within a singular conduit. Once combined within the singular conduit 33, the distances traveled by the contiguous first and second materials is minimal and the difficulties of lengthy contiguous travel are minimized. Simultaneously, equipment cost advantages are realized since the hot runner manifold system 50 is one singular system for both materials. In addition, hot runner manifold system 50 need not be a balanced conveyance system.

With reference to hot runner manifold system 50, it will be appreciated by those skilled in the art that separate and distinct conduits 52 and 54 may be used to convey materials from respective plasticizers 25 and 27 having substantially different processing temperatures. In such circumstances, the heating means 42 and insulating materials 43 would also be separate and distinct for each conduit 52 and 54. If the materials are of the same processing temperature, the temperature control means 42 may be either the same unit or adjusted to the equivalent temperatures. In either event, the conveyance of the specific materials are again kept separate until conveyed to the appropriate cavity groups 1. Conveyed first and second materials are then likewise supplied to one timed valve distribution system 21, 23 per group, for combining the materials into a contiguous length, and supplied to a balanced hot system 19, nozzle 28 and eventually to the appropriate individual cavity 3.

Figure 2:
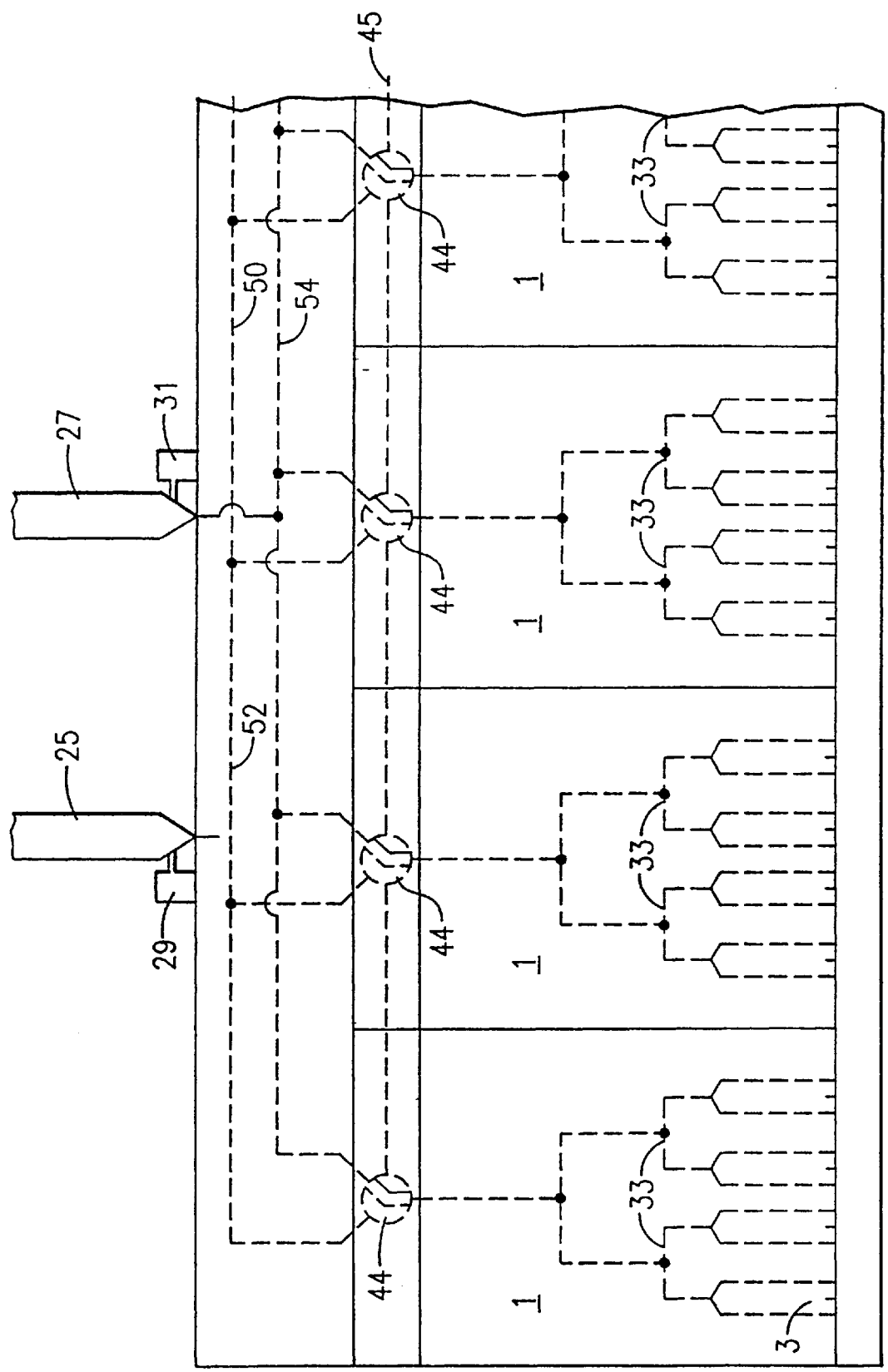
FIG. 2 is a fragmentary diagrammatic view of a multi-cavity coinjection mold according to a first embodiment of the present invention.

With reference to FIG. 2, an embodiment of a multi-cavity coinjection mold in accordance with the present invention will now be described. Only a portion of the mold is illustrated in FIG. 2 for purposes of simplicity. The mold has a large plurality of cavities 3, for example 24, 48 or 96, and these cavities are divided evenly into a plurality of cavity groups 1 in the present embodiment, each consisting of four (4) cavities 3, an associated balanced hot runner 33 and diverter valve 44, all of which function and are substantially as described with reference to FIG. 1. Although illustrated with each cavity group consisting of four (4) cavities and their associated components, it will be appreciated that each cavity group is formed of a relatively small number of cavities, for example 2, 3, or 4, the total number of cavities of the mold being evenly divisible by the number of cavities in each cavity group.

A hot runner manifold system 50 delivers separate molding materials from plasticizers 25 and 27 with their associated ram ports 29 and 31 through separate manifolds 52 and 54 for delivery to the diverter valves of each cavity group 1. The diverter valves 44 of the cavity groups are preferably synchronously operated to provide for the simultaneous injection of contiguously flowing materials in the manifolds 33 for the simultaneous injection of those materials with equal quantities to all of the cavities of the mold. The diverter valves 44 may be synchronously operated by electronic control or by a mechanical interconnection between all of the diverter valves or sets of the diverter valves, for example by a control shaft 45 shown diagrammatically in FIG. 2. As discussed elsewhere, the manifolds 52 and 54 may be separately dimensioned, do not need to be of a balanced manifold form and may be separately temperature controlled to provide different viscosities of materials to be injected into the cavities as control processing may require.

Figure 3:
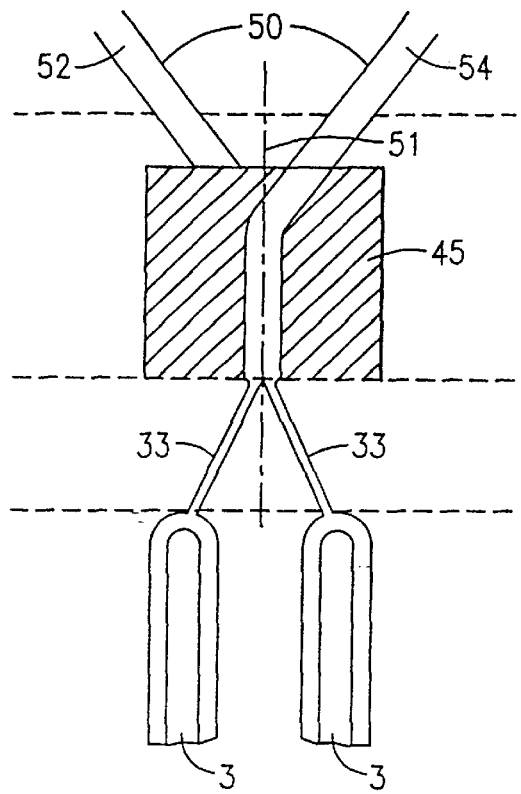
FIG. 3 is a diagrammatic view of one valve and nozzle arrangement of the present invention.

Now referring to FIG. 3, a diverter valve variant 45 is illustrated. In FIG. 3, the cavity group includes only two (2) cavities 3 supplied with contiguous materials for the coinjection of articles in the cavities by way of a balanced hot runner 33 which doubles as the nozzle arrangement for each of the cavities by virtue of a reduction in the cross-sectional area of the manifold system closely adjacent the valve whereby the nozzles extend substantially all the way from the valve to each of the cavities 3. The valve rotates about axis 51 under the control of a control mechanism to receive materials from manifold extensions of the manifolds 52 and 54. thus it will be appreciated that although there is a requirement for a hot runner balanced manifold for the contiguous supply of materials from the diverter valves 45 to the cavities, a part of that balanced manifold or substantially all of that balanced manifold may also constitute an extended nozzle terminating at the gate of each of the cavities.

Figure 5:
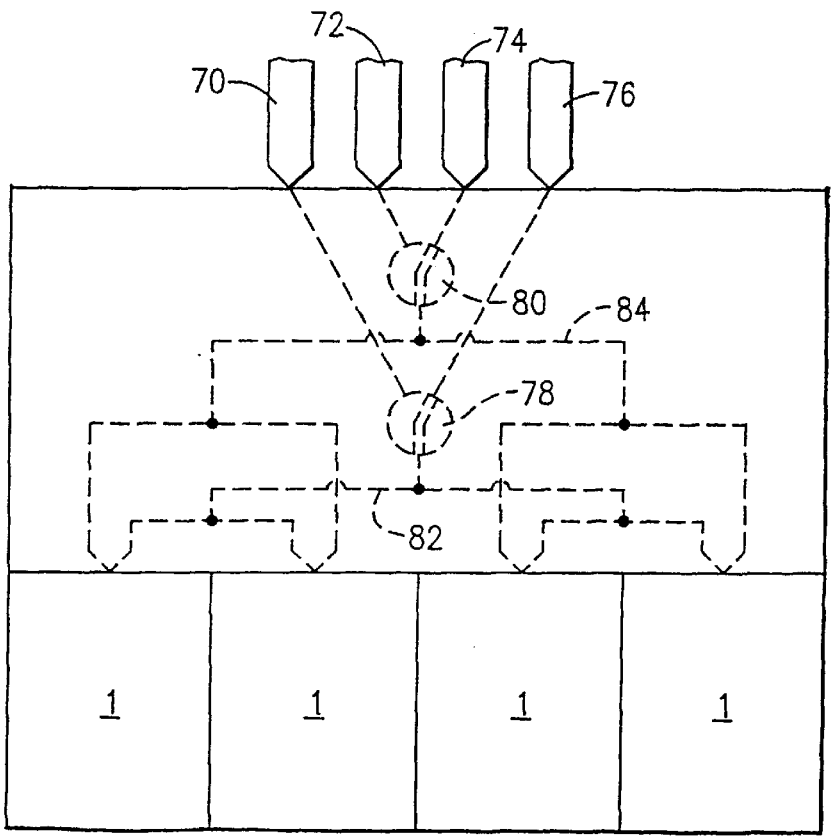
FIG. 5 is a block diagram illustration of a third embodiment of a multi-cavity coinjection mold according to the present invention.

It is also possible that the multi-layered article formed may be manufactured from three or more materials sequentially injected substantially simultaneously at the respective cavities. Such an embodiment could consist of a third conveyance means within hot runner manifold system 50 and appropriate revisions to valve mechanism 21, 23 or 45 or to the use of arrangements such as illustrated in FIGS. 4 and 5 hereof.

Figure 4:
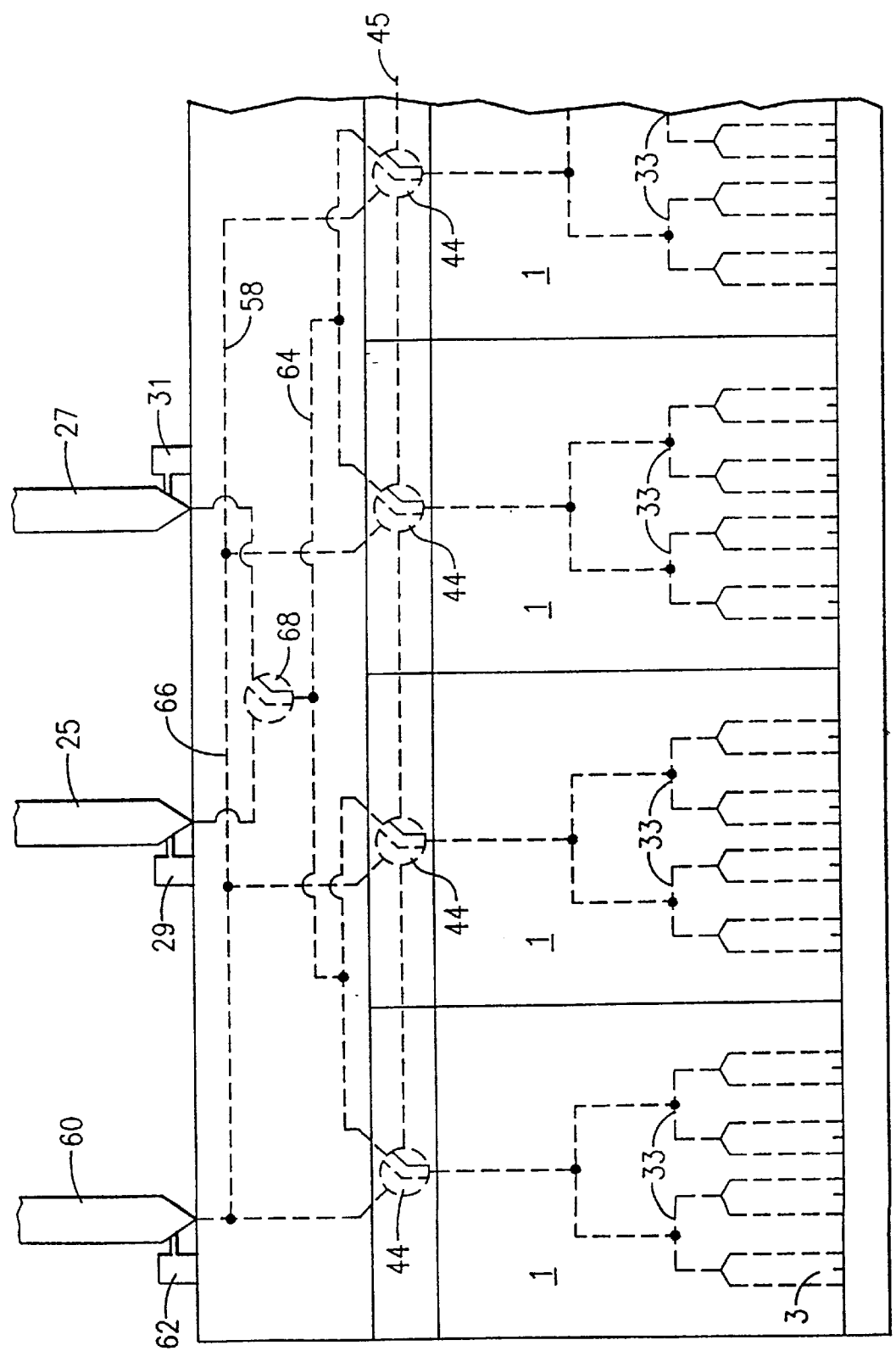
FIG. 4 is a fragmentary diagrammatic view of a multi-cavity coinjection mold according to a second embodiment of the present invention.

The second embodiment illustrated in FIG. 4 comprises multi-cavity coinjection mold having four cavity groups 1. The mold could have and usually would have a larger plurality of cavities 3, for example 24, 48 or 96, and these cavities would be divided evenly into a plurality of the cavity groups 1, each consisting of four (4) cavities 3, an associated balanced hot runner 33 and diverter valve 44, all of which function and are substantially as described with reference to FIG. 1. Although the illustrated with each cavity group consisting of four (4) cavities and their associated components, it will be appreciated that each cavity group may be formed of a relatively small number of cavities, for example 2, 3, or 4, the total number of cavities of the mold being evenly divisible by the number of cavities in each cavity group.

A hot runner manifold system 58 delivers separate molding materials from plasticizers 25, 27 and 60 with their associated ram pots 29, 31 and 62 through separate runners 52 and 64 for delivery to the diverter valves 44 of each cavity group 1. As with the first embodiment, the diverter valves 44 are preferably synchronously operated.

In this second embodiment the three plasticizers may provide three different materials, for example, virgin PET form plasticizer 60, recycled PET from plasticizer 25 and another material, such as a barrier material, from plasticizer 27. Alternatively plasticizer 27 could also supply virgin PET. In either circumstance the virgin PET from plasticizer 60 is supplied separately by way of an unbalanced hot runner 66 to the diverter valves 44 while the materials from the plasticizers 25 and 27 are metered by a diverter valve 68 to a balanced hot runner 64 for contiguous flow therethrough to supply the materials simultaneously and sequentially in equal quantities to the diverter valves 44 for metering, with the virgin PET from the unbalanced hot runner 66, to provide the contiguous supply of the three materials through the balance hot runners 33. Operation of the diverter valves 44 to ensure appropriate material metering.

In the event the material from the plasticizers 27 and 60 both being virgin PET, the arrangement of FIG. 4 can advantageously be used to supply virgin PET from plasticizer 60 to diverter valves 44 without any possible contamination by the recycled PET, thereby to facilitate the formation of the inner surface of a multi-layer article molded in the cavities with sufficiently pure virgin material for the prolonged exposure of beverages or food stuffs to that inner surface without fear of contamination. This is so, even though the materials pass contiguously through the balanced hot runners 33, as a result of the abbreviated form of runner 33 compared with the arrangements contemplated in applicants aforementioned patents.

In the variation of the second embodiment illustrated as a third embodiment in FIG. 5 four plasticizers 70, 72, 74 and 76 which may have associated ram pots (not shown in FIG. 5) separately supply a plurality of up to four different materials to diverter valves 78 and 80 for metering to balanced hot runners 82 and 84 for the contiguous supply of materials from plasticizers 70, 76 and 72, 74, respectively, to the diverter valves 44, of cavity groups 1, for metering thereby for the contiguous supply thereof through the balanced hot runners of the cavity groups to the cavities thereof in a manner substantially as previously described herein. As mentioned materials from different plasticizers could be the same.

It will be appreciated that in, for example, the second embodiment a single plasticizer could be used to supply the same material to both the unbalanced hot runner 58 and the diverter valve 68 and that similar variations are possible in the third embodiment. In addition the balanced hot runners 82, 84 may be identical in order to balance the contiguous supply of metered material therethrough or may be different from each other and/or controlled at different temperatures to provide desired characteristics of material flow to the cavities.

The valve mechanisms may be provided with an "off" or closed position as well as a position for the introduction of each material sequentially and contiguously into the manifold 33.

Of course it will be appreciated that diverter valve operation could be adjusted, if injection molding in different cavity groups is unbalanced thereby causing non-uniform layers and or parts from cavity group to cavity group, by sequentially operating the valves and/or changing valve timing to adjust material flow from one cavity group to another, for example, so that cavity groups that would receive the most material would have their diverter valve operation delayed to compensate and balance the flow of material to the groups.

One of the material may be recycled PET or a barrier material e.g. ethylene vinyl alcohol (EVOH) disposed intermediate polyester layers of the article.

What is claimed is:

1. A coinjection method, for use with a multi-cavity coinjection mold having a relatively large plurality of mold cavities for simultaneously molding a relatively large plurality of multi-layered articles, comprising the steps of:

dividing the relatively large plurality of cavities into a plurality of cavity groups of mold cavities, each group defining a relatively small plurality of said mold cavities;

providing a supply of a first and a second molding material;

providing a first hot runner system in communication with said supply of first and second molding materials;

using said first hot runner system for conveying said first and said second molding materials separately to a region proximate each cavity group;

providing a valve mechanism per cavity group for receiving said first and second molding materials from said first hot runner system;

using each valve mechanism to sequentially supply desired quantities of said first and said second molding materials contiguously to a single balanced hot runner for the associated cavity group, wherein each hot runner communicates with a single cavity group only; and controlling the temperature to maintain the desired respective temperatures of said first hot runner system, hot runners and said cavities.

2. The method according to claim 1 comprising:

dividing the large plurality of cavities so that all cavity groups have the same number of cavities; and ensuring that said single balanced hot runners of all cavity groups are identical in cross-sectional configuration and length thereby to facilitate simultaneous sequential supply of said molding materials to said relatively large plurality of cavities.

3. The method according to claim 1, wherein the relative small plurality of cavities is one of two, three and four in number.

4. The method according to claim 1 comprising synchronizing operation of all of the valve mechanisms of the groups.

5. The method according to claim 1, wherein the step of providing a first hot runner system connected to supply all of the valve mechanisms, includes providing a plurality of separate hot runners, at least one of which is unbalanced, for supplying said first and second molding materials separately to all said valve mechanisms.

6. The method according to claim 5 comprising providing the hot runner system in the form of two unbalanced hot runners, each for conveying one of said first and second molding materials separately to all said valve mechanisms.

7. The method according to claim 1, wherein the hot runner system includes a balanced hot runner and a diverter valve provides contiguously metered quantities of said first and second molding materials simultaneously in substantially equal quantities to all said valve mechanisms by way of the hot runner system.

8. The method according to claim 1, wherein the hot runner system, connected to supply all of the valve mechanisms, comprises at least two balanced hot runners each for supplying contiguous metered quantities of different said molding materials, by way of a diverter valve, simultaneously in substantially equal quantities to all said valve mechanisms.

* * * * *